United States Patent [19]

Jewell et al.

[11] 4,231,067
[45] Oct. 28, 1980

[54] TELEVISION IMAGE PROJECTION APPARATUS

[75] Inventors: Henry J. Jewell, Belleair; Richard L. Meyer, Largo, both of Fla.

[73] Assignee: Viewpoint, Inc., Largo, Fla.

[21] Appl. No.: 955,884

[22] Filed: Oct. 30, 1978

[51] Int. Cl.² .............................................. H04N 5/74
[52] U.S. Cl. ..................................... 358/237; 353/74; 358/250; D14/84
[58] Field of Search .............. 358/237, 238, 239, 248, 358/249, 255, 254, 250; 353/74, 75, 97, 100, 101, 119; 350/69; D14/77–79, 84

[56] References Cited

U.S. PATENT DOCUMENTS

| | | | |
|---|---|---|---|
| D. 250,263 | 11/1978 | DeZinno | D14/84 |
| 2,543,113 | 2/1951 | Leavitt | 353/74 |
| 3,037,072 | 5/1962 | Mendoza | 358/237 |
| 3,492,069 | 1/1970 | Kapilow | 353/101 |
| 3,800,085 | 3/1974 | Ambats et al. | 358/250 |
| 3,943,282 | 3/1976 | Muntz | 358/238 |
| 3,944,734 | 3/1976 | Ogawa | 358/250 |
| 4,021,105 | 5/1977 | Schubach | 358/237 |
| 4,051,535 | 9/1977 | Inglis | 358/237 |
| 4,074,322 | 2/1978 | Cammilleri | 358/237 |

FOREIGN PATENT DOCUMENTS 2419905 10/1975 Fed. Rep. of Germany .......... 353/101

*Primary Examiner*—John C. Martin
*Assistant Examiner*—Joseph A. Orsino, Jr.
*Attorney, Agent, or Firm*—Charles S. McGuire

[57] ABSTRACT

Apparatus for supporting a television receiver housing and projecting an image from the face of the picture tube to a remote, reflective screen having dimensions significantly larger than the picture tube. The apparatus includes a base providing an inclined support surface for the TV housing with an adjustable stop member for engagement with the lower, rear edge of the housing to establish the fore and aft position thereof on the support surface. The apparatus further includes a hood defining an enclosed path between an opening at one end for encircling the face of the picture tube of a TV supported on the base, and an opening at the opposite end in which the lens barrel of the projection lens system is frictionally engaged for unitary focusing movement. The TV set and the lens remain physically unattached to any elements of the projection system. The invention is also directed to novel features of the hood, per se.

16 Claims, 7 Drawing Figures

TELEVISION IMAGE PROJECTION APPARATUS

BACKGROUND OF THE INVENTION

The present invention relates to the optical projection upon relatively large viewing screens of the image on the face of a television receiver CRT. More specifically, the invention relates to novel apparatus for supporting and positioning a television set and associated elements for projecting the TV images for display in widescreen format.

Recently, there has been a great deal of interest in television picture display systems intended basically for home use wherein the image is presented on a viewing screen having a diagonal measurement of, say, 40 to 80 inches. Although in the earliest days of television images were projected from the face of a small, bright picture tube through an appropriate optical system to a remote screen, as typefied, for example, in U.S. Pat. Nos. 2,093,288 and 2,172,775, the early trend in the industry was toward development of picture tubes large enough to be acceptable for direct viewing rather than improvements in projection systems. However, it appears that there is now consumer demand for systems wherein the image on the face of a now standard size (e.g., 13 to 19 inch diagonal) picture tube may be projected to a much larger, remote viewing screen.

Among the various types of systems previously proposed for such purpose are those wherein the image is projected directly through a lens to a remote, rear-projection or backlight screen, such as that disclosed in U.S. Pat. No. 3,814,509; in other systems the image is reflected from mirrors and projected upon a screen mounted in the same cabinet or console with the picture tube, such as the units of U.S. Pat. Nos. 3,943,282, 3,944,734 and 4,058,837; in a third type the image is projected through a lens directly to the viewing surface of a remote, reflective screen, such as in U.S. Pat. No. 3,800,085; there are also combinations of such systems, as in U.S. Pat. No. 4,021,105. Each of the better known commercial forms of these systems require that the picture tube, which may be part of a conventional television set, be more or less permanently mounted upon or attached to the projection apparatus, or vice versa. In systems which are expressly directed to providing either projection of the CRT image on a large format screen or direct viewing thereof, typefied by aforementioned U.S. Pat. No. 3,800,085 and various commercial forms of such apparatus, an optical system including a suitable projection lens and a means defining a protected light path between the CRT face and lens is physically attached to the TV set for projection and detached therefrom for direct view. This sometimes requires physical alteration of the TV cabinet and, in any case, requires manual manipulation of screws, straps or other such retaining means each time the optical system is attached to and detached from the TV set.

It is a principal object of the present invention to provide apparatus suitable for projecting a large scale image of the picture tube face of a conventional TV set wherein the set may merely be placed upon a base support for such projection and lifted off the base for direct viewing, without physical attachment of the TV set and projection apparatus.

A further object is to provide a simple and inexpensive, yet highly reliable and durable means providing both a protected light path between the face of a TV picture tube and a projection lens, and a support for the lens allowing focusing movement thereof without physical attachment to the support.

Another object is to provide apparatus for projecting an image from the picture tube of a conventional TV set to a remote, large scale viewing screen which is easily adjustable to accommodate various size sets, to selectively change the vertical angle of the projection axis, and to effect focusing movement of the lens system.

A still further object is to provide a structure which may conveniently be formed from a single sheet of vacuum-formed plastic and serves both as an enclosed light path in an optical projection system and as a support for a lens barrel, allowing manual focusing movement of the lens system without physical attachment to the support.

In a more general sense, the object of the invention is to provide novel and improved apparatus for projecting a large scale image of a conventional TV picture which is both low in cost and superior in performance.

Other objects will in part be obvious and will in part appear hereinafter.

SUMMARY OF THE INVENTION

In accordance with the foregoing objects, the projection apparatus of the invention includes a hood of novel construction, preferably fabricated from a single sheet of vacuum-formed plastic, having a continuous side wall providing a protected light path between openings at opposite ends thereof. The opening at one end is preferably rectangular, being adapted to encircle the face of a conventional TV picture tube, and the opening at the other end is circular, being defined by a cylindrical wall member which extends internally of the side wall toward the rectangular opening.

The cylindrical wall tapers inwardly at an angle of about 5° for a portion of its length to a terminal end within the side wall. A plurality of axial cuts or slits are made through at least the tapered portion of the cylindrical wall. The material and thickness of the wall are such that the inwardly tapered portion is circumferentially flexible by virtue of the axial cuts.

The projection lens preferably includes a plurality of lens elements each rigidly supported in a unitary, cylindrical lens barrel. The diameter of the opening formed by the cylindrical wall section at the front of the hood is approximately equal to, or slightly greater than, the diameter of the lens barrel. Thus, the inwardly tapered portion reduces to a diameter smaller than that of the lens barrel and is flexed outwardly by insertion of the barrel to provide a resilient frictional engagement. The lens barrel is thereby supported at the front end of the hood and may easily be moved manually along the lens axis to effect focusing movement relative to the plane of the rectangular opening at the rear end of the hood.

A pair of rigid members such as flat metal strips are affixed to the hood along opposite sides of the rectangular opening and extend in parallel relation to terminal ends outwardly of the hood wall structure. The hood is connected to a base designed to support the television set having the CRT image to be projected. The base includes an upper wall defining a planar support surface having a forward edge at which the hood is connected with the plane of the rectangular opening perpendicular to that of the base support surface. A stop member is adjustably positionable along the support surface of the base with a forward edge extending laterally across a substantial portion of the support surface and maintained parallel to the forward edge thereof. The stop member engages the lower rear portion of the television set to hold the latter with the face of the CRT substantially at the plane of the rectangular hood opening.

A pair of slots extend through the upper wall of the base, adjacent the forward edge thereof, for registration with the aforementioned rigid members extending from the hood. The hood is connected to the base by placing the rigid members through the slots and frictionally engaging them with set screws, or similar structure, extending through the front wall of the base and having manual engagement portions forwardly thereof. Thus, the vertical position of the hood with respect to the base upon which it is mounted may be selectively adjusted.

The base is supported upon four wheels or casters, one adjacent each of the four lower corners of the structure. The two casters at the front corners are carried in a bracket extending across the lower front of the base and attached thereto for vertical adjustment. The upper wall of the base is inclined upwardly toward the forward edge thereof when the four casters rest on a substantially horizontal surface, whereby the side edges are disposed at a vertical angle which may be selectively adjusted within predetermined limits by selective positioning of the bracket carrying the two front casters.

BRIEF DESCRIPTION OF THE DRAWINGS

Details of construction of the preferred embodiment of the invention as summarized above will be more readily understood with reference to the accompanying drawings, wherein.

DETAILED DESCRIPTION

Figure 1:
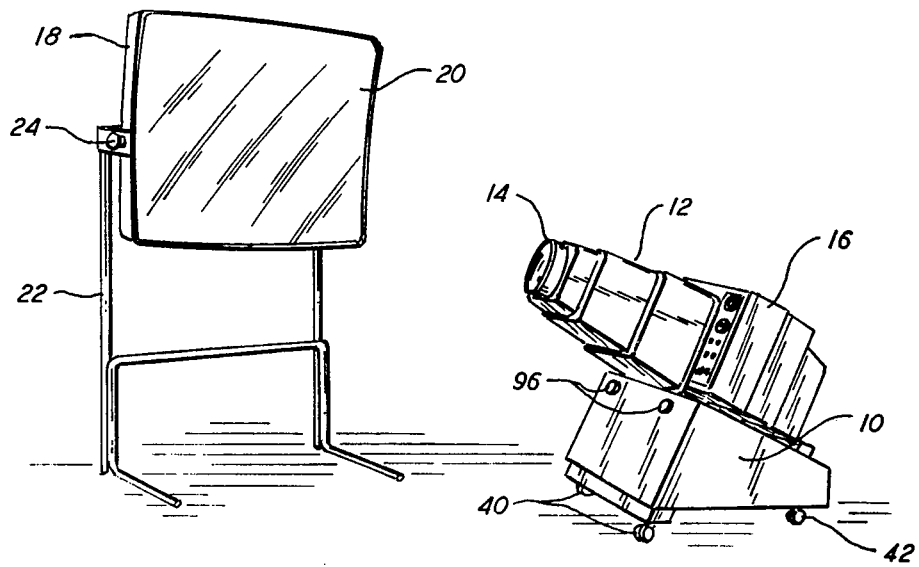
FIG. 1 is a perspective view of the apparatus of the invention, fully assembled and carrying a conventional television set, together with a remote screen upon which an enlarged image of the picture tube face is projected.

Referring now to the drawings, wherein like reference numerals denote the same elements throughout the several views, the projection apparatus is generally comprised of a base support unit 10, a projection hood 12 and a lens assembly 14. Television set 16 rests upon base 10, but is not physically attached thereto, or to any other part of the apparatus. Lens assembly 14 is of a commercially available type, preferably comprising a plurality of elements rigidly carried in a unitary, cylindrical lens barrel. A typical form of such lens assembly suitable for employment in the present invention is a three-element, injection molded, plastic lens manufactured by U.S. Precision Lens of Cincinnati, Ohio and sold under the trade name Beta-2.

TV set 16 may be virtually any commercially available portable or table model unit, conventional in all respects except that the leads to the deflection yokes are reversed in order to invert the image on the CRT in cases where the projection lens system does not include image erecting elements, as in the aforementioned Beta-2 lens. Such image inversion on the CRT screen is common in projection television systems, as noted for example in aforementioned U.S. Pat. No. 3,800,085. Preferably, a switch is installed in the deflection circuit lines and is manually engageable on the exterior of the set to permit selective orientation of the image on the CRT for either inverted projection to a remote screen or direct viewing when the set is removed from the projection apparatus.

Screen 18, having a highly reflective, concave viewing surface 20, is supported upon stand 22 or other appropriate structure. Pivotal supports 24 permit adjustment of screen 18 about a horizontal axis for maximum reflectivity at any desired viewing angle. Base 10 is positioned and appropriately adjusted as explained hereinafter, for intersection of the optical axis of lens system 14 with the center of viewing surface 20. The lens may then be focused by manual movement of the entire lens system as a single unit (i.e., the individual elements need not be moved relative to one another) along the optical axis, as also explained later in more detail. The image thus presented on viewing surface 20 is both sharp and bright, although presented over an area at least several times larger than that of the picture tube surface of TV set 16.

Figure 2:
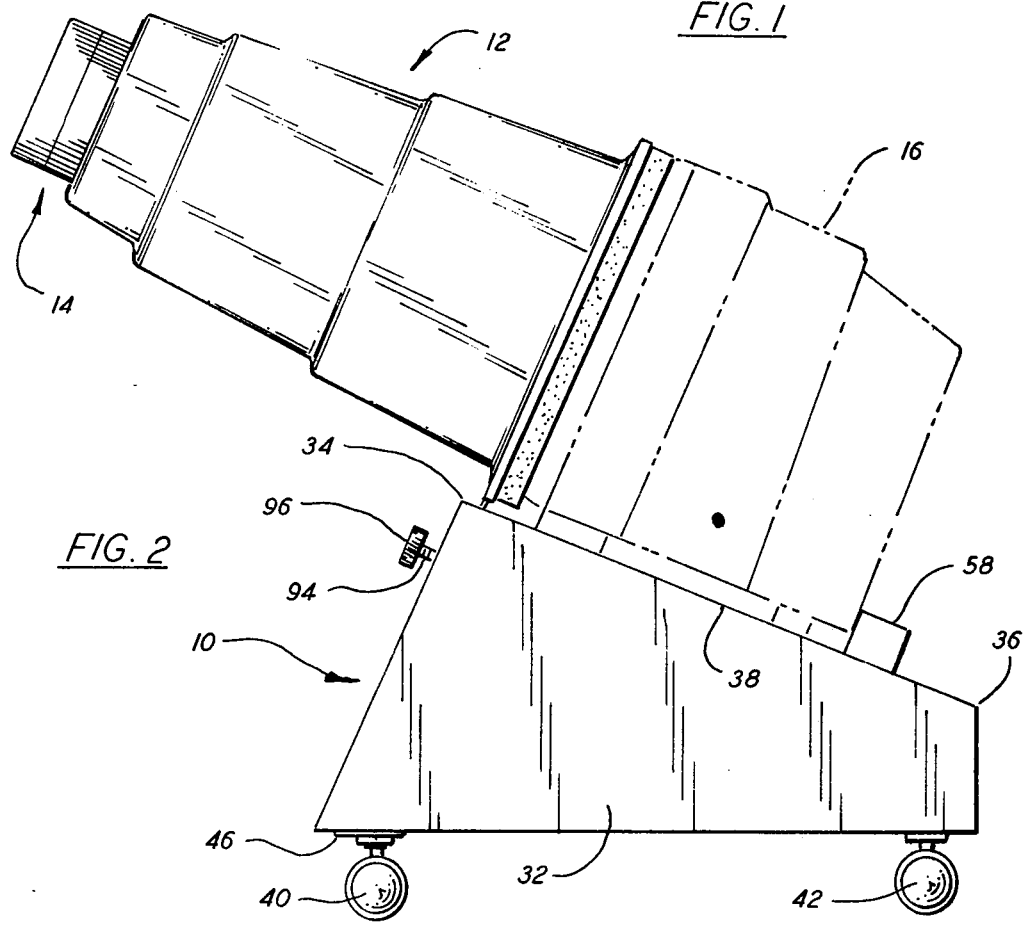
FIG. 2 is a side elevational view of the projection apparatus of FIG. 1.
Figure 3:
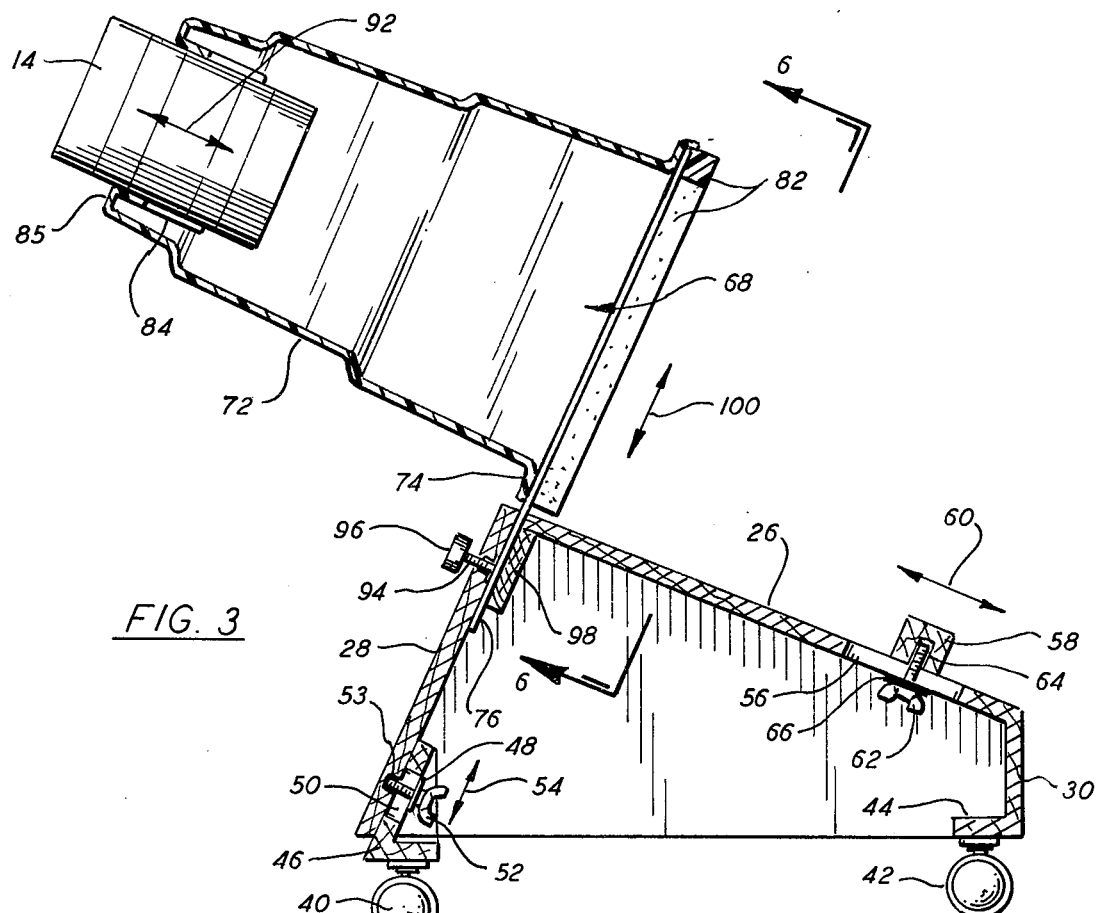
FIG. 3 is a side elevational view of the apparatus in vertical section on the line 3—3 of FIG. 4.
Figure 4:
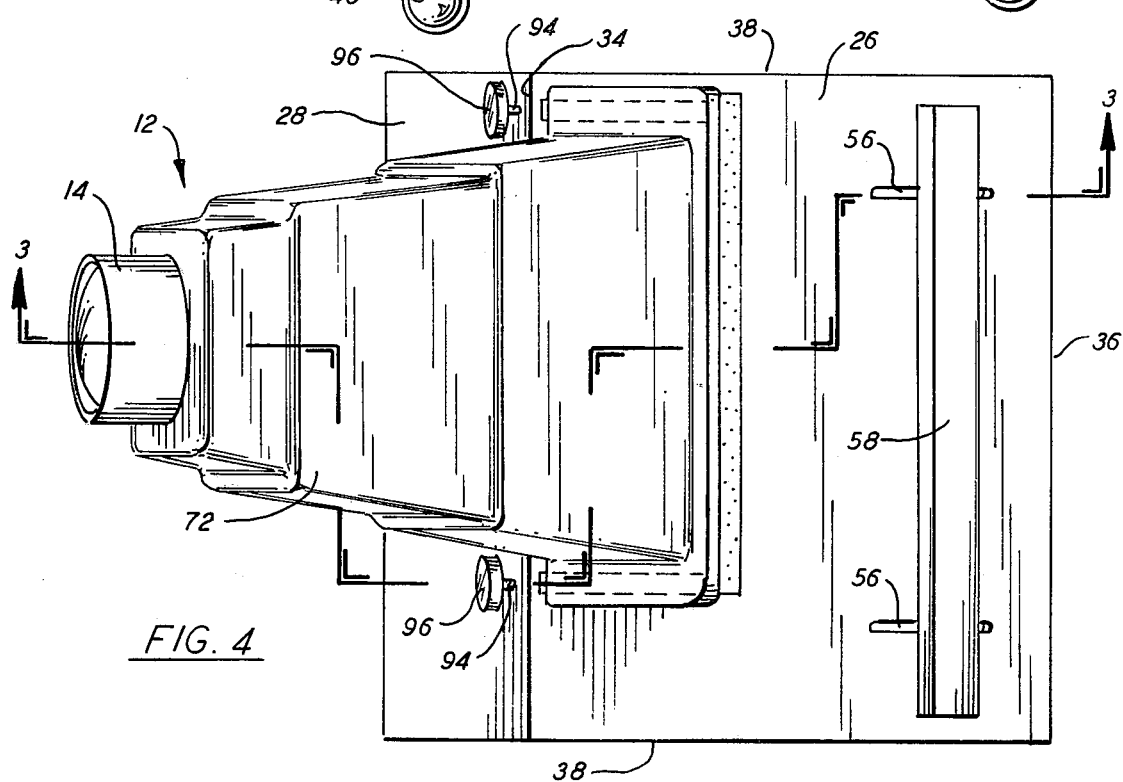
FIG. 4 is a plan view of the fully assembled apparatus, without the TV set.

Turning now to FIGS. 2–4, base 10 includes upper wall 26, providing a planar support surface for TV set 16, front and rear walls 28 and 30, respectively, and side walls 32. The support surface of upper wall 26 is bounded by edges denoted, for convenience, as front edge 34, rear edge 36 and side edges 38. Base 10 is supported for movement across the floor, or other horizontal surface, by wheels or casters adjacent each of the lower four corners, the front pair of casters being denoted by reference numeral 40 and the rear pair by 42. The support pins of rear casters 42 are inserted in appropriate openings in lower wall 44 which extends across the lower rear of base 10 for a short distance forwardly of rear wall 30. Front casters 40 are each carried by a substantially L-shaped support bracket 46 which is frictionally engaged between the rear side of front wall 28 and a pair of washers 48 which span vertically elongated slots 50 and are urged into engagement with bracket 46 by manually tightening wing nuts 52 on threaded members 53 extending fixedly from front wall 28. Although only one of washers 48, slots 50 and wing nuts 52 are shown (FIG. 3), it will be understood that an identical arrangement is provided at two points along bracket 46, equally spaced from the ends thereof. Thus, front casters 40 are adjustable in the directions of arrows 54 with respect to front wall 28 by loosening and retightening wing nuts 52. This allows selective adjustment of the vertical angle of side edges 38 of support surface 26, and thereby the optical axis of lens system 14.

A pair of slots 56, elongated in a directional parallel to side edges 38, extend through upper wall 26. Stop member 58, in the form of an elongated bar extending laterally across the support surface of upper wall 26, is adjustably positionable in the directions of arrows 60 by loosening and retightening wing nuts 62 on threaded members 64 extending fixedly from stop member 58 to frictionally engage washers 66 which span slots 56. Stop member 58 engages the lower rear side of TV set 16 (FIG. 2) to maintain the latter at the desired position between front and rear edges 34 and 36, the adjustability of stop member 58 permitting the unit to accommodate TV sets of various sizes. Lateral adjustment may, of course, be effected by moving the TV set itself to the desired position between side edges 38.

Figure 5:
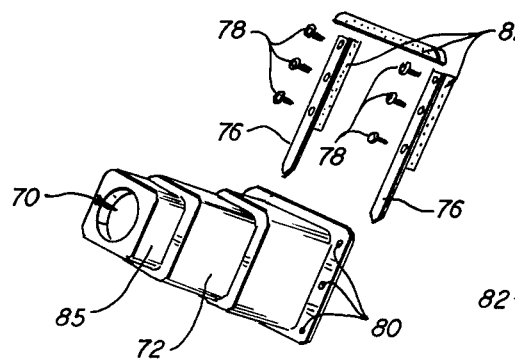
FIG. 5 is an exploded perspective view of the projection hood of the invention.
Figure 6:
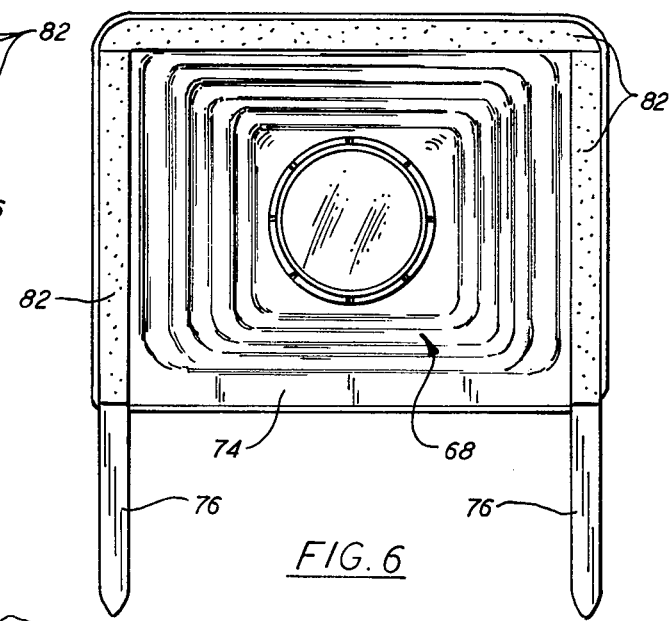
FIG. 6 is a rear elevational view of the hood.

Projection hood 12 will be described in greater detail with reference to FIGS. 5-7, although certain details of its construction as well as the manner of association thereof with base 10 are shown in FIGS. 2-4. Hood 12 is preferably a single, integral sheet of vacuum formed plastic, having certain support structure attached thereto. The single sheet is formed into a peripherally continuous wall structure providing an enclosed path between rectangular opening 68 at one end and cylindrical opening 70 at the other. Although the wall structure may obviously take many configurations, that of the illustrated embodiment is what may be termed a four-sided, stepped, truncated pyramid; that is, the wall is generally pyramidal, and includes three portions each tapering slightly, but the major dimensional differences from end to end is due to the abrupt, or stepped, change in peripheral dimension at the junctures of the several sections. The entire pyramidal portion of the hood, termed simply the side wall section, is denoted by reference numeral 72.

The hood is formed with a flat flange 74 encircling opening 68 at the large end of side wall 72. A pair of rigid, flat, metal strips 76 are secured to hood 12 along the sides of flange 74 by means of screws 78 which pass through openings 80 in flange 74 and are secured in registering openings in strips 76, the latter extending in parallel relation to terminal ends a substantial distance beyond the lower edge of flange 74. Strips of resilient material, such as foam rubber or plastic 82 are permanently secured by a suitable adhesive about the top and side edges of flange 74, in covering relation to those portions of metal strips 76 which are superposed with flange 74.

Figure 7:
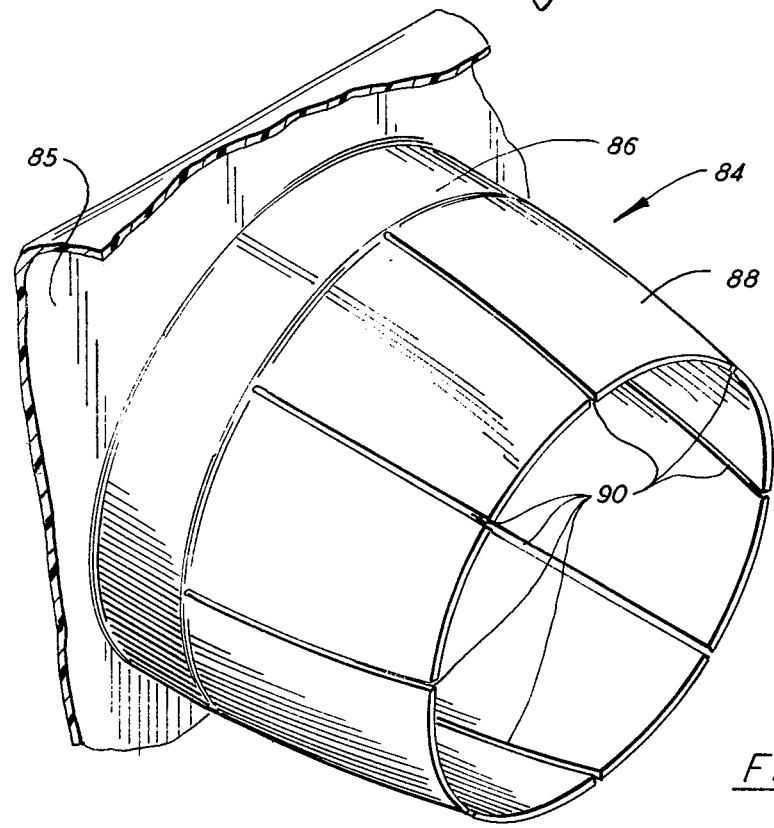
FIG. 7 is an enlarged, fragmentary view of an internal portion of the hood structure.

Integrally formed with side wall section 72, extending rearwardly within the side wall toward opening 68 and defining opening 70, is generally cylindrical wall section 84, seen in FIG. 3 and in enlarged perspective in FIG. 7. Cylindrical wall 84 is integrally joined to a generally planar, front portion 85 of wall section 72, and includes first and second portions 86 and 88. A plurality of axial cuts or slits 90 are formed along portion 88. Hood 12 is formed of such material and dimensions that the segments of portion 88 are resiliently flexible. The material may be, for example, ABS (acrynitral butadyene styrene) plastic having a thickness, prior to forming, of 0.225". Wall section 84 may have an overall length of about 2½ inches, with tapering section 88 preferably making up about 80% of the length, or 2 inches. The degree of inward taper toward the terminal end of wall section 84 is preferably about 5° for a hood of the material and dimensions set forth above.

Lens assembly 14, as previously mentioned, includes a rigid, cylindrical lens barrel of substantially uniform diameter. The nominal diameter of opening 70 and portion 86 of wall section 84 is equal to, or slightly greater than that of the barrel of lens assembly 14. Thus, the lens barrel may be slidingly inserted into section 86 from the front and, although there may be some frictional engagement there will be no interference which would prevent such insertion with normal vacuum molding tolerances of 0.015". Continued rearward movement of the lens barrel into section 88 will flex the individual segments outwardly to conform to the surface dimensions of the lens barrel. The latter is thereby frictionally engaged within wall section 84 and will remain in any position along its optical axis in which it is placed, but may be easily moved in the directions of arrows 92 (FIG. 3) to focus the lens relative to the face of the CRT of TV set 16.

Hood 12 is connected to base 10 by inserting the extending portions of strips 76 through a pair of openings provided for such purpose in upper wall 26 of the base adjacent front edge 34 thereof. Set screws 94 are inserted through threaded bushings in front wall 28 of base 10 and include manually engageable knobs 96, accessible on the front side of the base. Strips 76 are frictionally engaged between set screws 94 and backing board 98 (FIG. 3) which is secured within base 10 rearwardly of and parallel to front wall 28. Thus, the vertical position of hood opening 68 may be selectively adjusted, as indicated by arrows 100, to center the opening about the CRT face of the TV set positioned as previously explained upon base 10.

From the foregoing, it is apparent that the present invention provides an extremely effective and versatile, yet inexpensive, system for projecting a large scale image from the picture tube of a conventional television set to a remote screen. The TV set is not physically attached to any portion of the projection system, whereby it may simply be set upon the support base for projection purposes and lifted therefrom for direct viewing of the TV picture. The apparatus is readily adjustable without the use of tools to accommodate various sizes of TV sets; also, the vertical angle of the projection axis and focusing movement of the lens system may be easily and precisely adjusted. The unique construction of the projection hood contributes to the ease of adjustment and effective operation of the system with minimal cost.

What is claimed is:

1. A unit for supporting a television receiver housing and projecting an image from the face of a CRT thereof to a remote, reflective viewing screen, said unit comprising:
    (a) a base having a top wall upon which said CRT is placed defining a planar support surface with front, rear and side edges, said front and rear edges being horizontally disposed and said side edges being inclined upwardly from said rear to said front edge;
    (b) a stop member having a forward edge parallel to said front edge and adjustably positionable with respect thereto;
    (c) a projection lens mounted in a unitary lens barrel;
    (d) a hollow hood having a first end defining a first opening at least as large as the face of the CRT of the receiver supported by said unit, and a second end defining a second opening of substantially the same dimensions as said lens barrel and adapted to frictionally engage said lens barrel for adjustable positioning thereof along the optical axis of said lens, said hood defining an enclosed path between said first and second openings; and
    (e) means for attaching said hood to said base with said first opening arranged adjacent to and above said front edge, said attaching means including means extending below the bottom edge of said first opening for adjustably positioning said hood in a direction substantially perpendicular to said support surface.

2. The invention according to claim 1 wherein said first opening is substantially rectangular and said attaching means includes at least one rigid member fixedly attached to said hood and extending therefrom for adjustable attachment to said base.

3. The invention according to claim 2 wherein said adjustable positioning means includes at least one member mounted upon said base and movable into engagement with said rigid member to maintain said hood in a selected position with respect to said base.

4. The invention according to claim 3 wherein said base includes a front wall extending downwardly from said front edge of said support surface, said top wall includes an opening closely adjacent said front edge for receiving said rigid member to extend downwardly therethrough behind said front wall, and said member mounted upon said base extends through said front wall, having a portion forwardly thereof for manual engagement and a portion rearwardly thereof for engaging said rigid member.

5. The invention according to claim 4 wherein said member mounted upon said base is a threaded member movable through a threaded opening in said front wall to frictionally engage said rigid member.

6. The invention according to claim 1 wherein said lens barrel is cylindrical and said second opening is circular, having a diameter substantially equal to that of said lens barrel.

7. The invention according to claim 6 wherein said lens barrel is of uniform diameter from one end over at least a substantial portion of its length.

8. The invention according to claim 7 wherein said hood includes a front wall wherein said second opening is disposed and a substantially cylindrical section extending from said front hood wall rearwardly toward said first opening.

9. The invention according to claim 8 wherein the portion of said hood forming said substantially cylindrical section is flexible, having an unflexed position tapering inwardly over at least a portion of its length from said second opening to its end nearest said first opening, being flexed by insertion of said lens barrel therein to a cylindrical configuration.

10. The invention according to claim 9 wherein said substantially cylindrical section includes a plurality of cuts through the wall thereof extending axially from said end nearest said first opening for a predetermined distance toward said second opening.

11. The invention according to claim 1 and further including means supporting said base for selective adjustment of the angle of incline of said side edges.

12. The invention according to claim 11 wherein said base is supported upon a first pair of wheel members at the front and a second pair of wheel members at the rear.

13. The invention according to claim 12 wherein said selective adjustment means comprises means for adjusting the vertical position of said base relative to at least one of said pairs of wheel members.

14. A hood providing an enclosed light path for a projection unit and a support for the projection lens thereof comprising:
(a) a unitary side wall section defining an enclosed path between a first opening at one end and a second, circular opening, of substantially smaller area than said first opening, at the opposite end; and
(b) a substantially cylindrical wall section formed integrally with said side wall section and extending from said second opening toward said first opening to a terminal end within said side wall section for a predetermined fraction of the distance between said first and second openings;
(c) said cylindrical wall section being cut axially from said terminal end toward said second opening at a plurality of points about its periphery, thereby forming a plurality of segments, the material and thickness of said cylindrical wall section being such that said segments are flexible from a normal position to vary the diameter of said cylindrical wall section.

15. The invention according to claim 14 wherein said cylindrical wall section tapers inwardly over at least a portion of its length toward said terminal end when said segments are in said normal position.

16. The invention according to claim 15 wherein said cylindrical wall section is of uniform diameter extending from said second opening for a first portion of its length, and tapers inwardly over a second portion of its length to said terminal end, said cuts extending only along said second portion.

* * * * *